US007685616B2

(12) United States Patent
Virdi et al.

(10) Patent No.: US 7,685,616 B2
(45) Date of Patent: Mar. 23, 2010

(54) STRATEGIES FOR COALESCING CONTROL PROCESSING

(75) Inventors: Gurpratap Virdi, Bellevue, WA (US); Jeffrey A. Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 10/901,869

(22) Filed: Jul. 29, 2004

(65) Prior Publication Data

US 2006/0025869 A1  Feb. 2, 2006

(51) Int. Cl.
*G06F 3/00* (2006.01)
*H04N 7/16* (2006.01)

(52) U.S. Cl. .......................................... 725/38; 725/139
(58) Field of Classification Search ..................... 725/38
See application file for complete search history.

(56) References Cited

U.S. PATENT DOCUMENTS

| 5,504,823 | A | * | 4/1996 | Yoon ........................... 382/233 |
| 5,652,627 | A | * | 7/1997 | Allen ........................... 348/497 |
| 5,737,552 | A | | 4/1998 | Lavallee et al. |
| 6,674,858 | B1 | | 1/2004 | Kimura et al. |
| 6,742,082 | B1 | | 5/2004 | Lango et al. |
| 6,747,991 | B1 | * | 6/2004 | Hemy et al. ................. 370/468 |
| 6,795,863 | B1 | | 9/2004 | Doty, Jr. |
| 7,471,834 | B2 | * | 12/2008 | Sull et al. .................... 382/232 |
| 2002/0059638 | A1 | | 5/2002 | Oz et al. |
| 2002/0116471 | A1 | | 8/2002 | Shteyn |
| 2003/0196202 | A1 | * | 10/2003 | Barrett et al. ................... 725/50 |
| 2003/0222843 | A1 | | 12/2003 | Birmingham |
| 2003/0226151 | A1 | | 12/2003 | Hamada et al. |
| 2004/0165863 | A1 | * | 8/2004 | Johnson ......................... 386/95 |
| 2004/0194134 | A1 | * | 9/2004 | Gunatilake et al. ............. 725/38 |
| 2005/0094733 | A1 | * | 5/2005 | Daniell .................... 375/240.25 |

FOREIGN PATENT DOCUMENTS

| JP | 2002252844 A | 9/2002 |
| WO | WO0119088 A | 3/2001 |
| WO | WO03032638 A | 4/2003 |

OTHER PUBLICATIONS

Media Center Extender description, available at <http://www.microsoft.com/windowsxp/mediacenter/evaluation/devices/extender.mspx>, published on Jan. 7, 2004, accessed on Jul. 28, 2004, 2 pages.

(Continued)

*Primary Examiner*—Andrew Y Koenig
*Assistant Examiner*—Mark D Featherstone
(74) *Attorney, Agent, or Firm*—Lee & Hayes, PLLC

(57) ABSTRACT

Strategies are described for coalescing the processing tasks associated with a series of control events that occur relatively close together in time. The coalescing can involve eliminating redundant tasks by more directly advancing to a terminal control state. One exemplary application of the control coalescing is in the playback of media content information in a networked environment. When a user enters a series of commands to repeatedly change the channel, or repeatedly seek new positions within a single stream, the control coalescing comes into play by aggregating these control events so that it requires fewer control processing tasks to perform. This provision helps reduce the latency associated with handling multiple control events that occur close together in time.

24 Claims, 7 Drawing Sheets

OTHER PUBLICATIONS

Linksys introductory web page, available at <http://www.linksys.com/splash/wmalb_splash.asp>, accessed on Jul. 28, 2004; 1 page.

BroadQ introductory web page, available at <http://www.broadq.com/qcast2.htm>, accessed on Jul. 28, 2004, 2 pages.

Mediabolic introductory web page, available at <http://www.mediabolic.com/products/sampleproducts/networkedavreceiver.html>, accessed on Jul. 28, 2004, 1 page.

Jack Brassil and Henning Schulzinne, "Structuring Internet Media Streams With Cueing Protocols," IEEE/ACM Transactions on Networking, vol. 10, No. 4, Aug. 2002, pp. 466-476.

"Microsoft Windows Media Center Extender Technology Delivers Digital Entertainment and the Media Center Experience to Any Screen in the House," accessible at <http://www.microsoft.com/presspass/press/2004/Jan04/01-07eHomeCES2004PR.asp>, dated Jan. 7, 2004, accessed on Jul. 28, 2004, 4 pages.

* cited by examiner

STRATEGIES FOR COALESCING CONTROL PROCESSING

TECHNICAL FIELD

This subject matter relates to strategies for performing control processing, and, in a more particular implementation, to strategies for performing control processing in a media presentation environment.

BACKGROUND

Computers are becoming an increasingly popular mechanism for presenting media content information, such as audio information and video information. For instance, a user can receive content information from a remote source using a personal computer in the user's home that is coupled to the remote source via a network. The user may receive the content information as a complete file or in piecemeal streaming fashion. Alternatively, if the computer includes a tuner mechanism, the user may receive content information from conventional broadcast sources (such as cable or satellite sources) by tuning to these sources. The user may forward such content information to one or more appropriate playback devices in the home, such as a television or stereo system. Microsoft Corporation's Media Center technology provides one exemplary suite of tools for receiving and presenting media content information in the above-described manner. Using other tools, the user may couple multiple playback devices in the home into a presentation network. The user can then transfer media information from one device to another within the home. Universal Plug and Play (UPnP) technology provides one suite of tools for conveniently setting up such a home network.

While these developments offer many interesting enhancements compared to the conventional presentation of media content information, they also pose new challenges. Consider, for instance, the traditional case in which a user employs a conventional television to receive over-the-air broadcast media information. When the user makes a channel change, the television's tuner will react by tuning to the frequency of the new channel and presenting the media content information on that channel. This series of operations can be performed quickly, such that the user may receive virtually seamless media presentation as the user advances from one program to another. However, the above-described computer environments provide a more complex infrastructure for delivering content information. That is, these environments can include multiple computers that must interact with each other through a network connection. In these environments, a user's input instruction may require more complex processing, which may, in turn, incur appreciable latency. This raises the concern that the user may experience some undesirable delay when the user issues a control instruction. This may particularly be of concern in the case where the user makes several control instructions in quick succession.

There is accordingly a need for more efficient techniques for processing control information in a media presentation environment. Other technical fields may face similar challenges in effectively processing control information. Thus, more generally stated, there is a need for latency-efficient techniques for processing control information in any environment where the user (or other agent) can invoke multiple control actions in quick succession.

SUMMARY

According to one exemplary implementation, a method is described for processing control events. The method comprises: (a) receiving a first control event; (b) partially processing the first control event to provide feedback indicating that the first control event has been received; (c) receiving a second control event within a predetermined period of time of the first control event; and (d) aggregate-processing the first control event and the second control event together as a coalesced control event. The aggregate-processing of the first control event and the second control event together as a coalesced control event incurs a lower latency compared to separate processing of the first control event and the second control event.

According to another exemplary aspect, the aggregate-processing of the first control event and the second control event as a combined control event is prompted by the failure to receive a subsequent control event within a predetermined period of time of an immediately preceding control event.

According to another exemplary aspect, the partial processing comprises displaying metadata associated with the first control event.

According to another exemplary aspect, the metadata comprises textual information that confirms that the first control event has been received.

According to another exemplary aspect, the metadata comprises pictorial information that confirms that the first control event has been received (such as information extracted from a key frame).

Additional exemplary implementations are described in the following.

Figure 1:
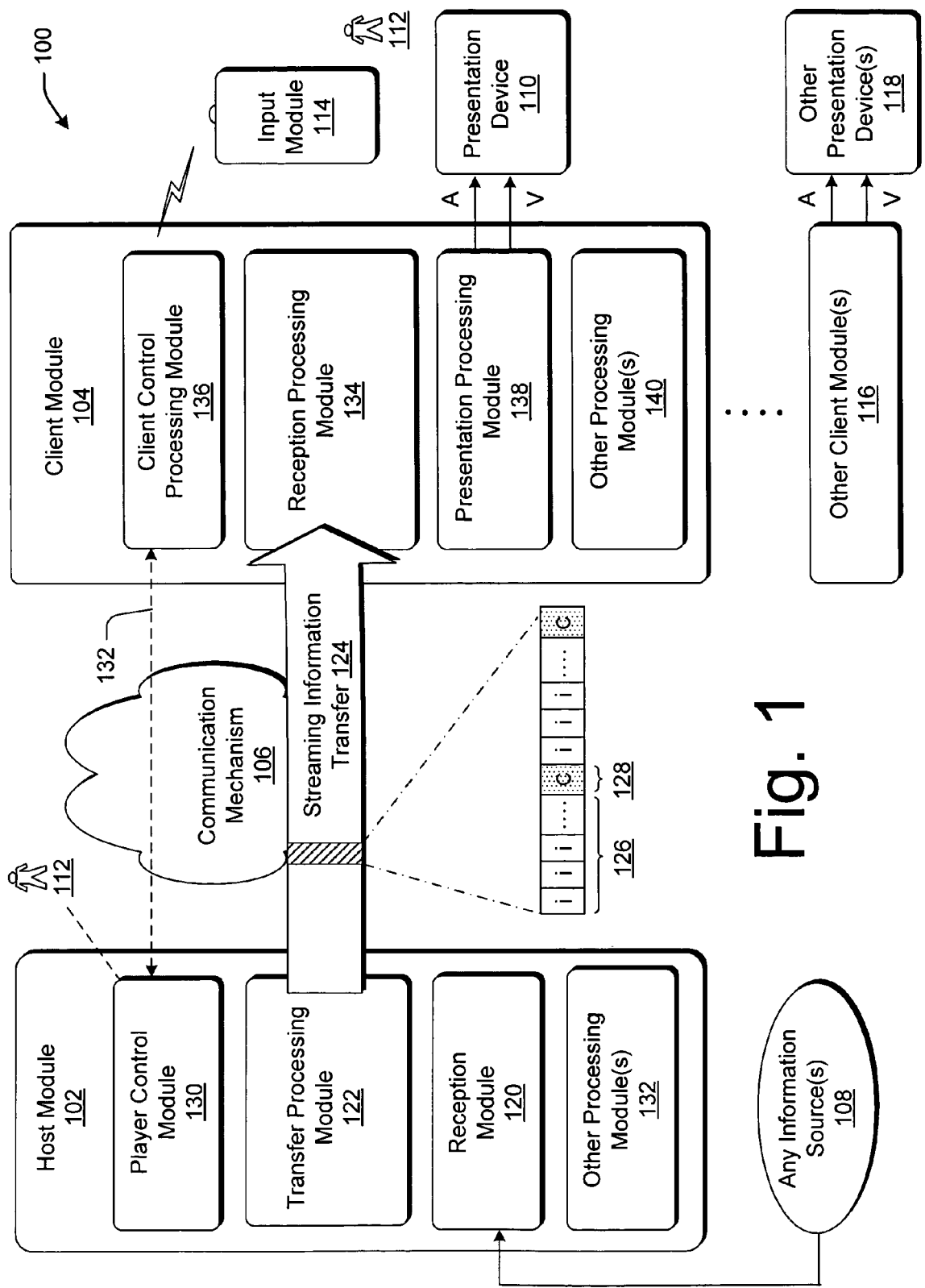
FIG. 1 shows an exemplary system for implementing aspects of the features summarized above.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth exemplary mechanisms and procedures for improving the performance of a system when the user (or other agent) invokes plural control actions within a short period of time. Each action would traditionally invoke separate control processing tasks having a prescribed latency L associated therewith. Thus, if the user (or other agent) invokes n control actions, then this would traditionally incur a latency of n*L. The mechanisms and procedures described herein coalesce control processing tasks prompted by multiple control events that occur within a short period of time. This coalescing can involve aggregating multiple control processing tasks to reduce the number interim tasks. For example, consider the case where the user's actions would traditionally sequence a system from control state A to control state B, and then from control state B to control state C; the coalescing in this case can involve aggregating these multiple control processing tasks so that the system moves directly from control state A to control state C, without visiting control state B. The coalescing can also optionally involve performing lower latency operations instead of simply omitting certain interim control processing tasks. For example, in the case above, the coalescing can at least alert the user to the fact that the user has sequenced the system through state B.

The above-described coalescing mechanisms and procedures can be applied to many different kinds of technical environments. For example, the coalescing mechanisms and procedures can be applied to any kind of media presentation environment. The techniques described herein are particularly beneficial in an environment in which a host module forwards media content information to a client module for presentation at the client module. For example, consider the case where the user employs the client module to quickly switch from channel A to channel B, and then from channel B to channel C. The coalescing can reduce the number of control processing tasks required by these channel changes to reduce overall latency associated with these changes, while still yielding the same end result as if the user had slowly sequenced through the channels. As mentioned above, the coalescing can further perform lower latency processing operations for those channels that are passed over quickly (that is, the "interim channels"). Such lower latency processing operations can include displaying metadata associated with the interim channels so that the user at least knows that he or she has sequenced through these channels. Metadata can take the form of textual information that describes the interim channels, thumbnails of program content taken from the interim channels (e.g., key frames), and so forth.

Similar techniques can be applied to other control tasks associated with the rendering of media content information. For example, coalescing can be applied to reduce the latency associated with multiple seek instructions that are invoked within a short period of time.

As to terminology, the term "media content information" (or "content information" for brevity) can pertain to any kind of resources that can be consumed by a user in any format, such as audio resources (e.g., music, etc.), still picture resources (e.g., digital photographs, etc.), moving picture resources (e.g., television programs, movies, etc.), computer programs (e.g., games, etc.), markup language resources (e.g., hypertext markup language resources received via a wide area packet network), and so on. The information can be expressed in analog form or digital form or a combination of analog and digital forms. The information can also include (or can omit) interactive content (as in the case with computer games).

The term control information refers to any information which has any kind of bearing on the content information. For example, the control information may describe some property of the content information, or may describe the behavior of some processing to be performed on the control information. The term "control event" refers to any kind of event which invokes the creation of control information. A user may trigger such an event by invoking express input actions (e.g., using a remote control or other input mechanism). Or the system may automatically generate a control event when certain conditions are met. The term "control processing task" refers to an operation that is performed upon the occurrence of a control event.

The term "coalescing" refers to any kind of processing which transforms multiple control processing tasks in any manner to reduce the combined latency associated with these tasks. Coalescing can involve omitting certain control processing tasks or restructuring a group of control processing tasks to more efficiently transition from an initial control state to final control state.

This disclosure includes the following sections. Section A describes an exemplary system for implementing the features summarized above. Section B describes an exemplary flowchart which shows the operation of the system of Section A. And section C describes an exemplary computer environment for implementing the system of Section A.

A. Exemplary System

A.1. Overview of System

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the terms "module," "functionality," or "logic" represent program code that performs specified tasks when executed on a processing device or devices (e.g., CPU or CPUs). The program code can be stored in one or more fixed and/or removable computer readable memory devices. The features of the techniques described below are platform-independent, meaning that they can be implemented on any commercial computing platform or networking strategy.

FIG. 1 shows an exemplary system 100 for performing the operations described above. The system 100 includes a host module 102 coupled to a client module 104 via a communication mechanism 106. Among other roles, the host module 102 serves to provide media content information and control information to the client module 104 for presentation thereat. The host module 102 may obtain the media content information from any source 108. The client module 104 may present the content information —in accordance with the control information—on any presentation device 110. A user 112 may interact with the client module 104 and/or the host module 102 via any kind of input mechanism, such as input module 114 (such as a remote control device or a keypad associated with the client module 104 or the presentation device 106). FIG. 1 additionally shows that one or more other client modules 116 may receive content information from the host module 102 and present such information on one or more other presentation devices 118.

The infrastructure shown in FIG. 1 can be applied to many different environments. In one case, the host module 102 represents a general purpose computer device within the home of the user 112 (or within some other local environment). The host module 102 can receive content information from any source 108, such as a local source (e.g., as implemented by a hard drive of the computer device, a local video jukebox, a local video camera, a local microphone, and so forth), or from a remote source. One remote source can represent traditional television and radio broadcast sources, such as a traditional wired sources (e.g., cable) or traditional wireless sources (such as an earthbound antenna or a satellite). Another remote source can represent a server or like device coupled to the host module 104 via a network, such as a TCP/IP network (e.g., the Internet). Still other kinds of sources can provide content information to the host module 102.

Any kind of business arrangement can govern the dissemination of content information to the host module 102. The sources 108 can distribute the resource information on a fixed time schedule or in an on-demand fashion. The sources 108 can charge a fee to receive the content information, or can distribute this information free of charge.

Likewise, the content information itself can have many forms. The content information may represent live content information or pre-recorded content information. The content information can have an audio component and/or a visual (video) component and/or an interactive component. The content information can represent static information (as in the case of one or more photographs), or "moving" information (such as in video). The content information can be expressed in any format, such as MPEG-1, MPEG-2, or WMV for video information (among other formats), and MP3, WMA, or WAV (among other formats) for music information. The content information can be expressed in digital form, analog form, or a combination of analog and digital forms. Still other kinds of source formats can be received.

In one exemplary implementation, the client module 104 can represent another kind of computer device located in the user 112's home. For instance, the client module 104 may represent another general purpose computer device. Or the client module 104 can represent a special-purpose computer device, such as a game console or an extension console designed for the main purpose of receiving content information from the host module 102 (and thereby "extending" the number of output devices that the host module 102 can direct content information to within the home). Or the client module 104 can represent logic functionality integrated within the presentation device 110 itself.

In an exemplary home application, the user 112 may have situated several of the client modules 104 in different respective rooms of the home, which in turn are coupled to different media presentation devices located in these rooms. Each of these client modules can be configured to receive content information from the host module 102. Where these client modules 104 are implemented as "extensions" to the host module 102, they may be configured to run several instances of the functionality provided by the host module 102. The system 100 can be further configured to allow concurrency in use among the separate components of the system 100. For instance, a first user may use the host module 102 to perform a first task while a second user uses the client module 104 to perform a second task, without necessarily interfering with the first user.

The presentation device 110 can represent any type of device whereby a user can consume the content information. Possible types of presentation devices 110 include televisions, radios, stereo systems, computer monitors, and so forth.

The communication mechanism 106 can represent any conduit for transmitting information from the host module 102 to the client module 104. In a local environment, the communication mechanism 106 can be implemented as a Local Area Network (LAN), such as an Ethernet network. Any protocol or combination of protocols can be used to forward information from the host module 102 to the client module 104, such as the TCP/IP protocols. The communication mechanism 106 can be physically implemented using any combination of physical components, such as various wired communication paths (cooper wire, power line, fiber optic, etc.) and various wireless communication paths. Although not shown, the communication mechanism 106 can also incorporate various routers, name servers, gateways, and so forth.

Figure 7:
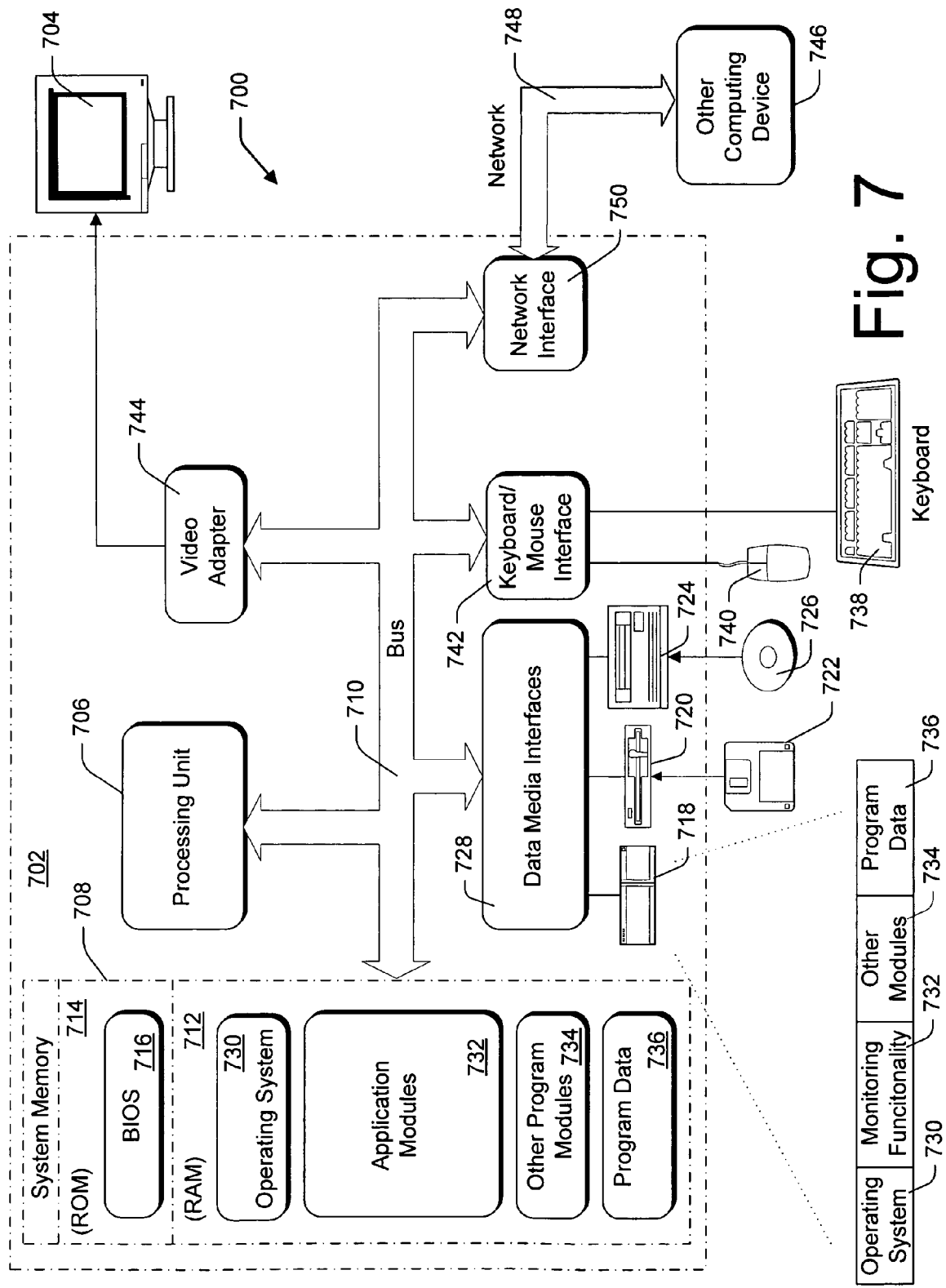
FIG. 7 shows an exemplary computing environment for implementing aspects of the system shown in FIG. 1.

The above-described environment is exemplary and non-limiting. In another application, the host module 102 can represent a server type of computer or a peer computer that is remote with respect to the client module 104. For instance, the host module itself 102 can represent a server computer outside the home that provides content information to the client module 104 over the Internet or some other network. Still other applications are possible; the host module 102 is to be understood as any source of content information wherever situated and however implemented, and the client module 104 is to be understood as any recipient of content information wherever situated and however implemented. FIG. 7, to be discussed below in turn, provides further details regarding one implementation of the host module 102 or the client module 102 using an appropriately configured general purpose computer device (e.g., a personal computer, etc.) or special purpose computer device (e.g., a game console, an extension device, etc.)

With the above overview, attention will now be directed to the individual exemplary components of the host module 102 and the client module 104.

To begin with the host module 102, a reception module 120 receives information from the information source 108. The reception module 120 can represent a tuner which tunes to a physical frequency associated with the information source 108, or can represent multiple tuners that can simultaneously tune to multiple sources. Alternatively, or in addition, the reception module 120 can represent a network interface module (such any kind of modem) which receives content information from a digital network source.

Figure 2:
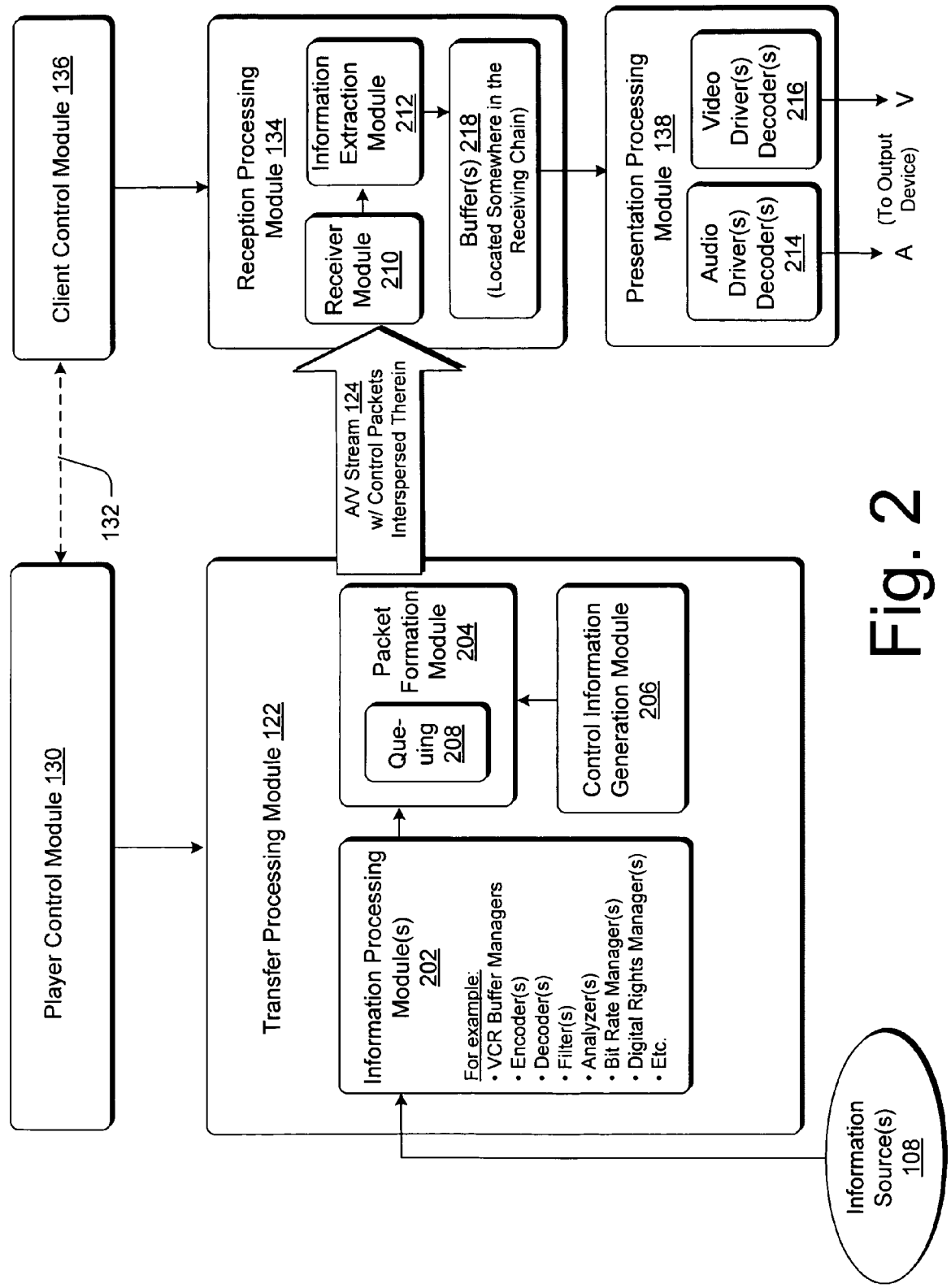
FIG. 2 shows a more detailed block diagram of selected components of the system of FIG. 1.

A transfer processing module 122 performs a variety of processing tasks on the content information to format it for transmission over the communication mechanism 106 to the client module 104, and then transmits such information. FIG. 2 describes an exemplary composition of the transfer processing module 122. Suffice it to say at this juncture in the discussion that the transfer processing module 122 can filter and/or analyze the content information to prepare it for transmission, adjust the bit rate of the information, assemble the information into packets, multiplex the packets into a transmission stream for output to the communication mechanism 106, and so forth.

FIG. 1 represents the transmission of information content as stream 124. A stream refers to the transmission of content information in piecemeal fashion, such that the client module 104 can receive and render part of the content information without receiving the entire body of such information (as opposed to the transmission of a file containing the complete content information). The stream 124 can include a plurality of units 126 (e.g., packets) that primarily convey the content information, that is, in the case of an A/V resource, the actual audio and visual data. The stream 124 can also include one or more control units 128 (e.g., packets) dispersed in the stream of content information 126. The position of the control packets 126 within the stream 124 conveys information regarding how the control information contained therein is to be applied to the content information. (The "position" may be reflected by the sequence numbers assigned to the packets within the stream 124, rather than the physical ordering of packets in an actual transmitted stream; this is because, in a packet network, it can be expected that some packets will be received "out of order," requiring the client module 104 to reassemble them in the proper order.) For instance, the exemplary control packet 128 may convey the fact that the content information stream that preceded it in time has come to an end. Or the exemplary I control packet 128 may convey the fact that prescribed processing behavior should be applied to the content information 126 which follows it in time. Or the exemplary control packet 128 may convey that there is a discontinuity between the content information which precedes it and the content information 126 which follows it. Still other applications and interpretations of the control packet 128 are envisioned.

A player control module 130 controls the components in the host module 102. For instance, the control module 130 can set up a communication session with the client module 104 and then control the state of the client module 104 across multiple potential player instances. This module 130 can also play a role in coalescing control processing tasks that meet certain criteria (as will be described below).

The player control module 130 can also forward control instructions to the client module 104 via a separate communication path 132. Thus, the control information sent on path 132 supplements the control information sent in-band within the stream 124 (or, in another interpretation, it can be said that the control information sent in-band supplements the control information forwarded on communication path 132). According to one exemplary design paradigm, the control information can be sent in-band in those circumstances where it is important to convey the timing (or positional alignment) of this information vis-à-vis the content information. The communication path 132 can be used to communicate control event information which does not need to be conveyed in as precise a temporal/positional manner as the in-band control information. Generally, different applications can use different communication channels to communicate different control events depending on the unique requirements of these applications. The communication path 132 can employ a different communication mechanism and/or protocol than used by the communication mechanism 106, or it can use the same mechanism and protocol.

Still additional control paths can be included. For instance, the host module 102 can use another control path (not shown) to control the display of graphical and metadata-related information on the client module 104. For instance, this control channel can be used to coordinate the display of various menus, program bars, channel information, and so forth on the presentation device 110. One exemplary and non-limiting protocol that can be used to accomplish this task is the Remote Desktop Protocol (RDP). This protocol allows the system 100 to essentially "project" the graphical functionality associated with the host module 102 onto the presentation device 110 via the client module 104. However, this strategy is exemplary rather than limiting; other techniques can be used to forward graphical information to the presentation device 110. Generally, metadata-related information and graphical information can originate from the host module 102, and/or the client module 104, and/or the presentation device 110, and/or some other module; further, any module or combination of modules can be used to coordinate the display of this metadata-related information and graphical information.

Finally, the host module 102 can include a number of other modules 132 for performing other unspecified tasks (that are not relevant to the focus of this discussion).

Now addressing the components of the client module 104, the client module includes a reception processing module 134 for receiving the stream 124 and performing processing on the stream. FIG. 2 provides additional details regarding this component 134. Suffice it to say at this juncture of the discussion that this component 134 can demultiplex the information within the stream 124 and extract the information contained therein. The packets can include ID information which identifies their composition—e.g., whether they contain audio information, video information, or control information. In the event that a packet includes control information, the reception processing module 134 performs one or more control operations based on the control information. Further, the reception processing module 134 forwards the content information down to appropriate renderers for presentation of this information. Further, the reception processing module 134, as well as the client control module 136 (to be described below), can control the renderers to perform various operations. The reception processing module 134 can use the in-band control information (e.g., 128) to control the renderers.

A client control processing module 136 also controls the components in the client module 104. The client control processing module 136 also interacts with the player control module 130 to transmit and receive control information over path 132. For instance, the client control module 136 can provide an interface used to transmit various asynchronous events to the player control module 102, such as an end of stream event (indicating that the client module 104 has reached the end of the stream 124), a pause event (indicating that the user 112 has paused the presentation of content information), a stop event (indicating that the user 112 has stopped the presentation of content information), various error events, and so forth.

A presentation processing module 138 can include various functionality for rendering the content information. For instance, it can include audio drivers, video drivers, etc. The presentation processing module 138 can be implemented as a separate module from the presentation device 110, or can be integrated with the presentation device 110 itself.

Finally, the client module 104 can include a number of other modules 140 for performing other unspecified tasks (that are not relevant to the focus of this discussion).

FIG. 2 shows further details regarding the transfer processing module 122, the reception processing module 134 and the presentation processing module 138.

To begin with, the transfer processing module 122 can include an information processing module 202. The information processing module 202, in turn, can include a suite of processing tools that can be flexibly configured to perform different processing operations on content information received from the information source 108. That is, different collections and combinations of such tools can be selected based on the type of content information that is received, and based on what kind of output format is desired, and so forth. Exemplary such tools can include:

Buffer managers that provide personal video recorder (PVR) type functionality, such as the ability to record content information, pause the content information, jump to different locations within the content information, and so forth.

Various encoders for encoding the content information into a desired format, or decoders for decoding the content information that is expressed in a given format.

Various content filters and analyzers for modifying the content information to improve the quality of presentation of the content information at the client module 104. Different applications can adopt a different collection of such filters and analyzers (or can entirely omit such filters and analyzers) depending on the characteristics and demands of the particular applications.

Various rate filters that control the bit rate of the steam 124. For instance, one such filter can lower the bit rate when the available network bandwidth drops because of congestion or interference. This filter can lower the bit rate by re-encoding the stream or dropping frames, etc.

Various digital rights management (DRM) filters for encrypting the content for transmission over the control mechanism 106, and for performing other rights management functions.

Figure 3:
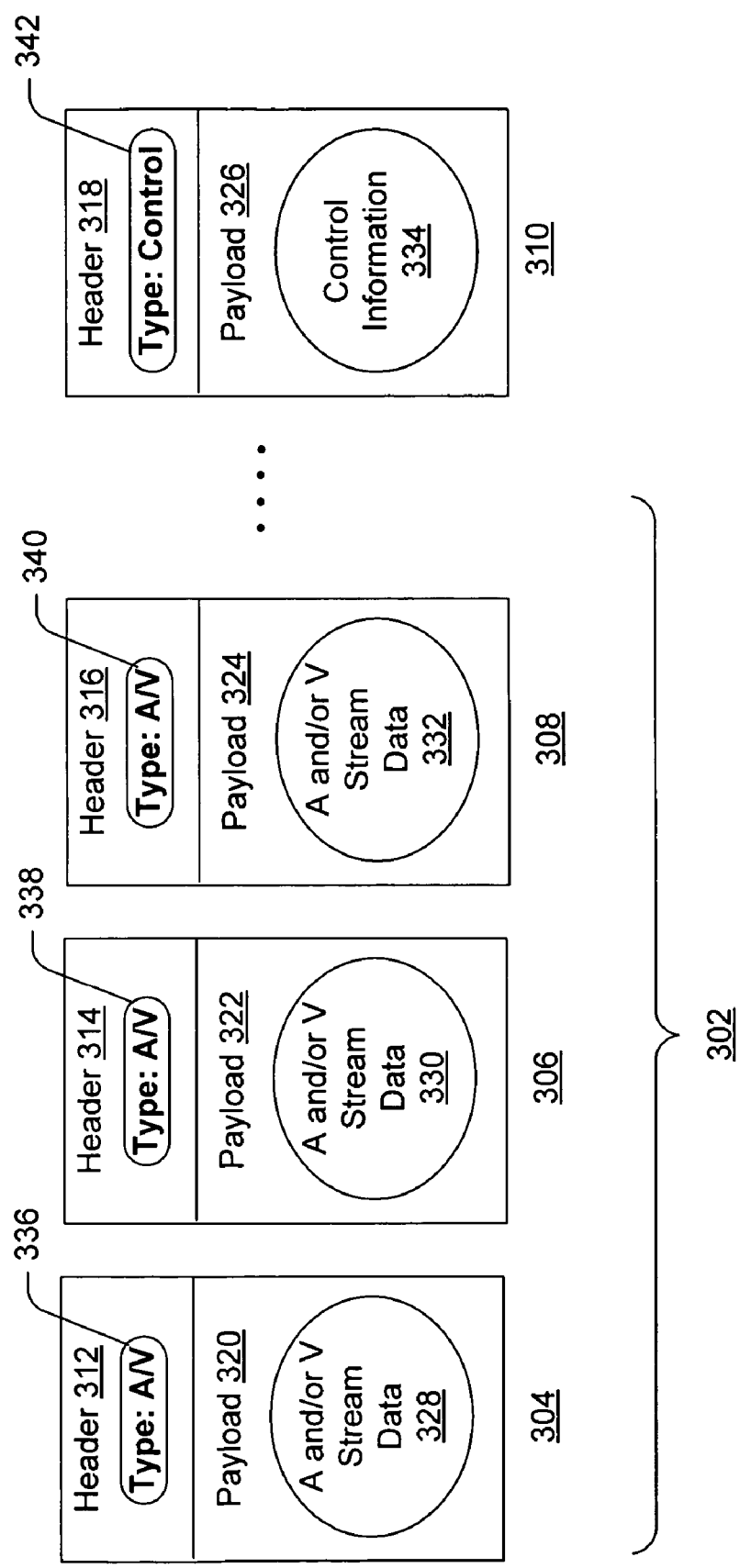
FIG. 3 shows an exemplary series of packets that can be transmitted using the system of FIG. 1, where the packets include control information dispersed among content information.

A packet formation module 204 receives an output from the information processing module 202 and places this output into a form suitable for transmission over the communication mechanism 106. The packet formation module 204 can use any protocol to process the content information. To provide one non-limiting illustration, FIG. 3 shows the creation of a number of packets. A stream 302 can be formed by starting with a sequence of key frames and delta frames. A key frame represents a stand-alone representation of a video frame that can be used to reconstruct the video without reference to other frames. The delta frames can be used to predicitvely reconstruct a video frame based on other information in the sequence. A serialized stream is formed from the above-described data, containing video, audio, and other information. A packetized stream is then formed by breaking the serialized stream into packets. Each packet can include a header and a payload. Finally, packets can be further multiplexed into groups and sent over the communication mechanism 106 as a transmission stream. A number of standards can be used to implement the above concepts, including, but not limited to, MPEG-2, the Real-Time Transport Protocol (RTP), various proprietary standards, and so forth; however, the principles described herein are not wedded to any specific standards.

Referring to FIG. 2, the packet formation module 204 performs the above-described tasks by assembling the packets into groups by multiplexing them. A control information generation module 206 inserts control packets 128 into the stream 124 along with the content packets 126. The packet formation module 204 uses a queue 208 to create and transmit the stream 124. That is, the queue 208 stores packets in an order received and a worker thread (not shown) extracts packets from the queue 208 and combines them with other packets.

Advancing again to FIG. 3, this figure shows an exemplary series of packets (304, 306, 308, . . . 310). Each packet (304, 306, 308, . . . 310) includes a respective header (312, 314, 316, . . . 318) and accompanying payload (320, 322, 324, . . . 326). The payloads can include audio information or video information. Further, according to the present system 100, the payloads can also include control information. For instance, payloads 320, 322 and 324 include audio or video information (328, 330, 332), while payload 326 includes control information 334. The headers (312, 314, 316, . . . 318) include various identification data (336, 338, 340, . . . 342), including an indication of what type of data their respective payloads (320, 322, 324, . . . 326) contain. More specifically, headers 312, 314 and 316 include identification data (336, 338, 340) that indicates that their payloads include audio information or visual information (328, 330, 332), while header 318 includes identification data 342 which indicates that its payload 326 contains control information 334.

Returning to FIG. 2, the reception processing module 134 includes a receiver 210 configured to receive the stream 124. An information extraction module 212 receives an output of the receiver 210 and extracts various fields of information from the received stream 124. For instance, the information extraction module 212 can demultiplex the stream 124 and determine on a packet-by-packet basis whether it contains audio information, video information or control information. This can be performed by investigating the identification data (336, 338, 340, . . . 342) in the headers (312, 314, 316, . . . 318) of the received packets (304, 306, 308, 310). The reception processing module 134 performs appropriate processing on the content of the payloads (320, 322, 324, . . . 326) based on their assessed content. Control information conveyed by control packets can include instructions which govern the behavior of the processing performed by the client module 104.

The reception processing module 134 forwards content information that it has received to the presentation processing module 138. The presentation processing module 138 renders the content information using various decoders and drivers (214, 216), as well as other processing mechanisms.

Finally, FIG. 2 indicates that the client module 104 includes a jitter buffer 218 (referred to as simply a buffer below). The buffer 218 stores a certain amount of content information that it receives from the stream 124 on a first-in-first-out (FIFO) basis. The presentation processing module 138 draws from this buffer 218 when rendering the content information. In the event of a glitch (e.g., a slight interruption) in transmission, the presentation processing module 138 can thereby pull previously received content information from the buffer 218 without the glitch negatively affecting the presentation of the content information. The presentation processing module 138 will, however, suffer performance degradation when it reaches the end of the content information stored in the buffer 218 without receiving more content information from the stream 124, because presentation of additional content information is not possible. Generally, FIG. 2 depicts the buffer 218 as a component of the reception processing module 134; but this buffer 218 can be positioned elsewhere in the chain of modules that act on the received content information. Also, the client module 104 may include plural buffers.

There are various occasions when it is desirable to flush the buffer 218. For instance, when the user jumps from one stream to another stream, the buffer 218 no longer stores useful content information that can be relied on in compensating for network glitches. The client module 204 thus flushes the buffer 218 in these circumstances and refills it with content information taken from the other stream. The client module 204 may flush the buffer 218 upon channel changes (where the user jumps from the stream of one program to the stream of another program), and upon seeks (where the user jumps from one portion of a program to another portion of the same programs (e.g., occurring earlier or later in time).

However, the client module 104 is not the only component in the system 100 that is affected by stream discontinuities. When the user 114 changes a channel, for instance, the client control processing module 136 can inform the host module 102 of this event, and the host module 102 can respond by taking appropriate measures. Namely, for example, the transfer processing module 122 on the host module side also may include information stored within queues as well as configuration settings; this information may need to be flushed upon a break in the stream 124. Accordingly, the host module 102 can also coordinate flushing of relevant information stored in the transfer processing module 122, as well as handling other configuration tasks. The transfer processing module 122 responds to discontinuities by cleanly demarcating such breaks in the stream by inserting various stream boundary information into the stream 124. The reception processing module 134 can then skip packets in the received stream 124 until it receives the stream boundary information.

It is therefore apparent that the interaction between the client module 104 and the host module 102 can be relatively intricate, requiring the exchange of control information, the flushing and refilling of one or more buffers, the reconfiguration of various settings, and so forth. This intricacy can incur an appreciable latency when the user 112 invokes an operation which causes a break in the stream 124. To address this issue, the system 100 can include a coalescing module (to be described in Section A.2 below) which reduces the latency in situations in which the user 112 makes multiple control actions within a short period of time. For instance, the coalescing module can come into play by reducing the latency associated with the user repeatedly making a series of channel change commands or seek commands within a relatively short period of time.

A.2. The Coalescing Module

Figure 4:
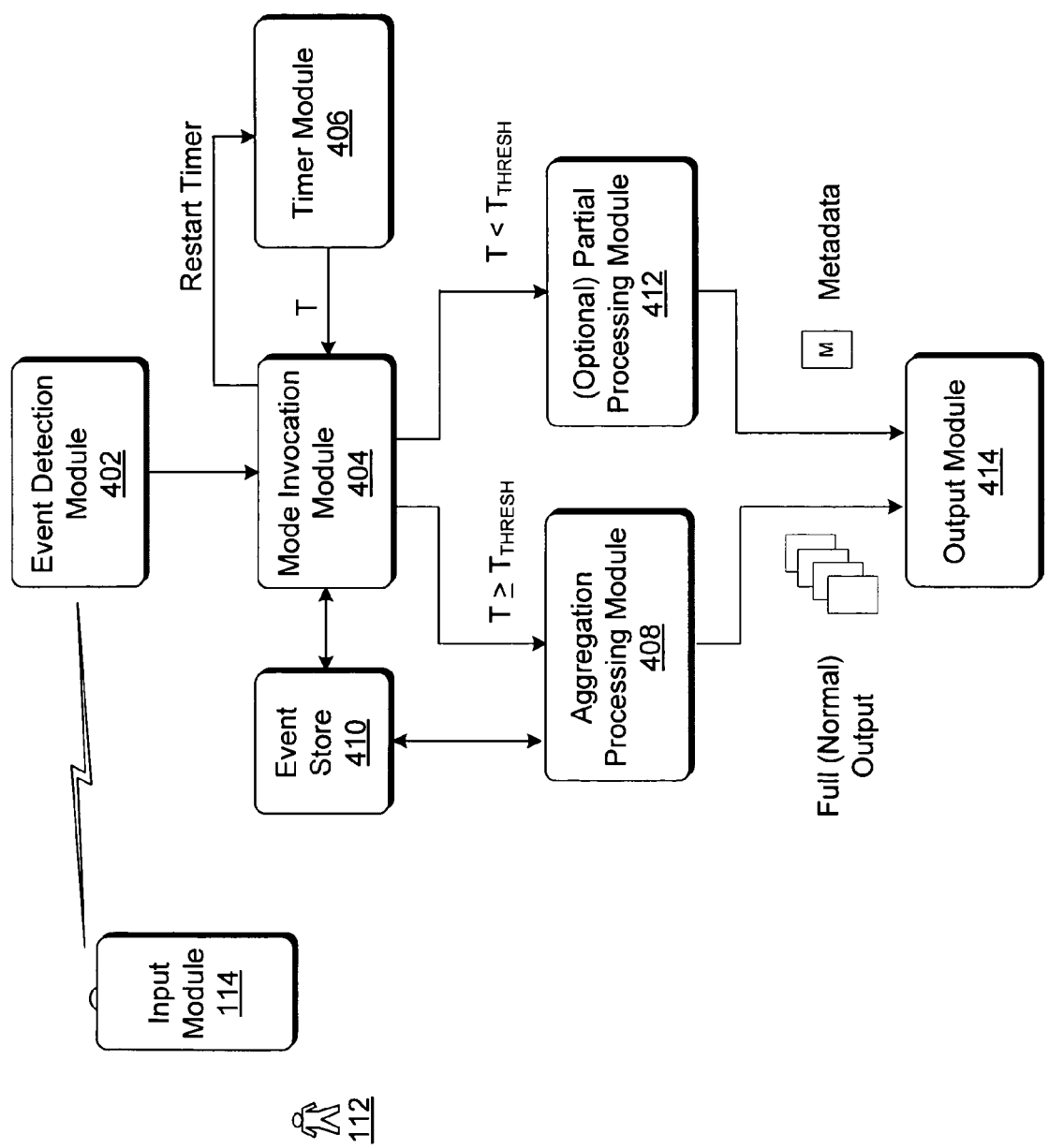
FIG. 4 shows an exemplary module for coalescing control processing tasks in any technical environment, such as the system of FIG. 1.

FIG. 4 shows a control coalescing module 400 that can be applied to the system of FIG. 1, as well as to any other processing environments that involve the processing of a series of control processing tasks. As noted above, the main goal of the control coalescing module 400 is to aggregate plural control processing tasks so as to reduce the amount of time required to perform these tasks.

The control coalescing module 400 includes an event detection module 402 for detecting a control event. A control event may be triggered when the user 112 takes an express input action via the host module 102 or the client module 104, such as by changing a channel or entering a command to move to (e.g., seek to) a predetermined part of the stream 124. Or the control event may be triggered in response to some automated event.

The control coalescing module 400 includes a mode invocation module 404 which determines what processing should be performed in response to the detected control action. The mode invocation module 404 is coupled to a timer module 406. The mode invocation module 404 operates by starting (and zeroing) the timer module 406 upon the occurrence of an event. If the time T provided by the timer module 406 reaches a prescribed threshold ($T_{THRESH}$) (e.g., 1 second) prior to the event detection module 402 detecting a subsequent control event, then the mode invocation module 404 can invoke an aggregation module 408. In the event that only one control event has been detected, an aggregation module 408 performs whatever processing tasks it normally performs in response to a control event, requiring a latency L.

However, assume that the user 112 invokes a second control event prior to the time T on the timer module 406 reaching the prescribed threshold $T_{THRESH}$. This occurrence first of all prompts the mode invocation module 404 to re-zero and restart the timer module 406. It also prompts the mode invocation module 404 to record information about the user 112's first control event in an event store 410. For instance, assume that the user is initially watching channel 5 and then presses a CHANNEL UP button, causing a first control event, and very shortly thereafter presses the CHANNEL UP command again, causing a second control event. In this case, the mode invocation module 404 can be configured to store a history of the user 112's control actions in the event store 410, such as, in the above scenario, information indicating that the user switched from channel 5 to channel 7. This procedure is repeated each time that the user 112 activates a control event before the timer module 406 reaches its prescribed threshold ($T_{THRESH}$). Thus, when the user invokes a final control event, the event store 410 will contain a complete history of the user 112's actions that were clustered together in a brief time span. A "final" command refers, in this case, to a command which is not immediately followed up by another command within the prescribed threshold ($T_{THRESH}$).

When the mode invocation module 404 detects such a final command, it invokes the aggregation processing module 408. The aggregation processing module 408 analyzes the event store 410 to determine the series of control events that have transpired in quick succession. The aggregation processing module 408 also determines an efficient strategy for transitioning from the initial control state (associated with the first control event) to a final control state (associated with the final control event). The strategy may eliminate some of the processing tasks that would have been required had the user 112, in an alternative comparison scenario, sequenced through the channels slow enough so as not to invoke the coalescing operation for these channel changes. For instance, consider the case where the event store 410 reflects that the user 112 has advanced from channel 5 to channel 6, from channel 7 to channel 8, from channel 8 to channel 9, and then from channel 9 back again to channel 8. The aggregation processing module 408 may aggregate this control information to provide a combined instruction to advance from channel 5 to channel 8. The aggregation processing module 408 can then perform whatever processing is required to accomplish this result, as if the user had initially entered a single command to move from channel 5 directly to channel 8. Such processing may involve the steps described above, such as flushing the buffers provided by both the reception processing module 134 and the transfer processing module 122, inserting boundary information into the stream to demarcate a break in streams, refilling the buffers with content information associated with the final channel, and so forth. In the special case where the user 112 rapidly transitions through a series of channels to return to the initial channel, the aggregation processing module 408 might decide to perform no tasks.

It therefore can be appreciated that the above-described processing performed by the mode invocation module 404 and the aggregation module 408 have the effect of reducing the total amount of latency associated with multiple control events that occur within quick succession. The above scenario where the user takes a roundabout way of getting from channel 5 to channel 8 would invoke five separate processing operations if these events occurred with sufficient time between them, thus incurring a total latency of 5*L. By aggregating the changes to produce the joint effect of moving directly from channel 5 to channel 8, the latency can be reduced to $L+T_{AGG}$, where $T_{AGG}$ represents any lag time associated with performing the coalescing itself.

A number of variations of the above-described strategy can be employed. For instance, instead of maintaining a serial history of control events, the event store 410 can coalesce the control events "on the fly" after receiving each control event. For example, in this implementation, after the above sequence of control events, the event store 410 can provide a single result which indicates that the user moved from channel 5 to channel 8, rather than providing the complete thread of changes from channel 5 to channel 8. Also, in the above description, the aggregation processing module 408 performs aggregation by omitting certain intermediary processing tasks; however, in another case, the aggregation module 408 can invoke any other kind of latency-saving measures that may restructure the tasks without formally canceling any tasks.

In one case, the coalescing module 400 can be configured to perform no processing tasks until the timer module 406 reaches the prescribed threshold $T_{THRESH}$. In another case, the coalescing module 400 can include a partial processing module 412 which performs some partial processing before the condition $T \geq T_{THRESH}$ is satisfied. For instance, the partial processing module 412 can be configured to automatically flush the buffers and perform other preparatory tasks upon the occurrence of a first control event in a possible sequence of control events. This is because the buffers will have to be flushed in any event, so it may be prudent to do so as soon as possible; what remains undetermined is the final control state that the user 112 will eventually arrive at.

Further, when the user 112 invokes a control event, the partial processing module 412 can provide information to the user 112 which alerts the user 112 of this event, even though the coalescing module 400 might not completely process the control event at that time. For instance, the partial processing module 412 can display any kind of metadata associated with a change in control state. In the context of the channel changing scenario, this can involve displaying textual information that identifies the channel that the user 112 has tuned to (even if only momentarily). Such metadata can be extracted from electronic program guide information (EPG) downloaded from a provider of such information, or can be generated locally by the client module 104 based on logic which monitors and notifies the user of channels changes. For instance, the client module 104 can include locally stored graphics which are invoked when the user 112 changes channels, without incurring the more time-consuming tasks of flushing and refilling the buffers, and so forth. Other provisions can be employed for providing textual metadata that reflects a channel change in a time-efficient manner.

In addition, or alternatively, the partial processing module 412 can present a sample of the content information being presented on each channel that the user 112 sequences through (but again, without requiring the complete operations involved in changing channels). The partial processing module 412 can perform the above operation by displaying one or more key frames associated with each channel that the user 112 tunes to, even momentarily. More specifically, the transfer processing module 122 can implement this operation by transmitting only key frames, rather than the full sequence 302 of key frames and delta frames in the stream. The partial processing module 412 can present key frames as thumbnail images or as some other reduced-content samples of the content information being presented on the channels. In any of the cases, any graphics or metadata-related information can be transmitted via a separate control channel (not shown) using any protocol (e.g., RDP); this is only illustrative, as other techniques can be used to present graphics or metadata-related information on the presentation device 110.

Finally, the coalescing module 400 includes an output module 414 for presenting the output of the aggregation processing module 408 and the partial processing module 412. The output constitutes the content information and/or the metadata described above.

The modules shown in FIG. 4 can be implemented by different parts of the system 100 shown in FIG. 1. For instance, in one exemplary case, the event detection module 402, mode invocation module 404, timer module 406, event store 410, and parts of the aggregation processing module 408 and the partial processing module 412 can be implemented, in whole or in part, by the control modules (130, 136) shown in FIG. 1. The actual part of the aggregation processing module 408 and the partial processing module 412 devoted to executing coalesced command instructions can be implemented, in whole or in part, by the transfer processing module 122 and the reception processing module 134, and/or the control modules (130, 136). The output module 414 can be implemented by presentation processing module 136 in conjunction with the presentation device 110. The presentation device 110 can be a television, a stereo system, and so forth. The coalescing module 400 was described principally with reference to the example of changing channels. However, the coalescing module 400 can be applied to other operations performed by the system 100. For instance, suppose that the user 112 makes several requests to seek particular parts of the stream 124. This will require successively jumping to new parts of the stream and will therefore require repeatedly flushing the buffers in a similar manner to that described above. The coalescing module can come into play by ensuring that unnecessary control processing tasks are removed or restructured in the case where the user 112 issues multiple seek instructions in quick succession. The coalescing module 400 can also be applied to reduce the latency of other processing tasks performed by system 100.

Further, the coalescing module 400 can be applied to other environments besides the system 100 shown in FIG. 1. For example, assume that a user issues several requests to queue up different tracks of a compact disk. This typically requires the control mechanism of the CD player to make a large jump to the general part of the CD where the desired track is present, followed by a more fined-tune movement to the exact track position requested by a user. In the event that several requests are made, the coalescing module 400 can come into play by determining an initial starting location and a terminal location for this aggregate operation, and then traveling to the terminal location without advancing to the intermediary locations. Still further applications are possible, including those that do not pertain to media playback.

Figure 5:
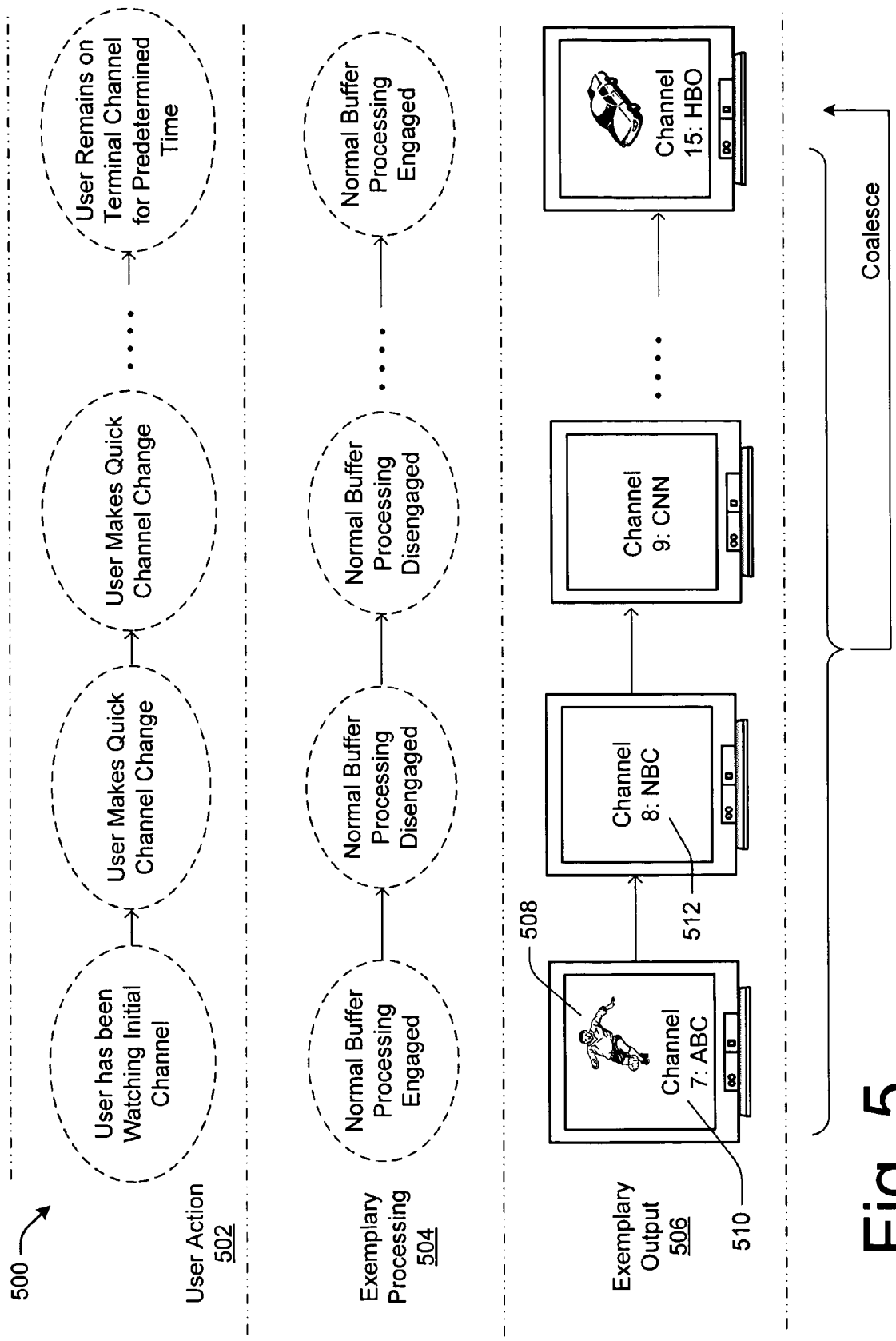
FIG. 5 shows one exemplary scenario that illustrates the operation of the module of FIG. 4.

FIG. 5 shows one application of the coalescing module 400 to a channel changing scenario 500. The top row of this figure shows a series of user actions 502. These actions 502 correspond to the case where the user 112 has repeatedly activated the CHANNEL UP button on the input module 114 to move from initial channel 7 (which the user has been watching for some time) to final channel 15. The user moves through these channels quickly such that $T \geq T_{THRESH}$ is not satisfied for any of these control state transitions.

The second row of FIG. 5 shows a series of control processing tasks 504 that are invoked in response to the actions taken in the first row. In the first column, the system 100 is engaged in normal presentation of the content information provided by a particular channel (i.e., channel 7). Presumably, the buffers remain full and the presentation processing module 136 is successfully drawing content information from the buffers in the normal manner without incurring glitches. Subsequently, for each of the brief transitions to adjacent channels (where $T \geq T_{THRESH}$ is not satisfied in each case), the system 100 suspends normal processing. This means that the system 100 may initially flush the buffers (because this has to be performed regardless of the final state), yet will not begin to refill the buffers with interim content information that the user 112 does not intend to consume anyway (as evidenced by the fact that the user 112 does not remain on these interim channels for very long). In the last column, $T \geq T_{THRESH}$ is satisfied, and the system 100 commences processing the content information in a normal manner by filling up its buffers and supplying the presentation processing module 136 with content information taken from these buffers.

Finally, the last row of FIG. 5 shows a series of output displays 506 corresponding to processing operations 504 shown in the middle row. In the first column, the presentation device 110 presents a normal television output showing the program (and potentially the metadata "Channel 7: ABC" associated with the program). The second and third columns in this row omit the normal display of television programs being presented on these channels (i.e., channels 8 and 9), because this data is not supplied to the buffers in a normal manner. However, in an optional alternative implementation, the system 100 can supply any kind of metadata to the presentation device 110 in lieu of a full program presentation. Such metadata can be formed from textual metadata (e.g., metadata 512) that describes the channel and/or its content. Although not shown, such metadata can also include reduced-sized versions of one or more frames of the programs being aired on the interim channels. These reduced-sized versions can be generated based one or more key frames received from the host module 102, or by some other mechanism. Although not shown in FIG. 5, the reduced-size versions can be displayed as thumbnail images, or in some other manner. Finally, in the last column of FIG. 5, the system 100 again resumes its normal presentation of a program that the user 112 has eventually settled on.

B. Exemplary Method of Operation

Figure 6:
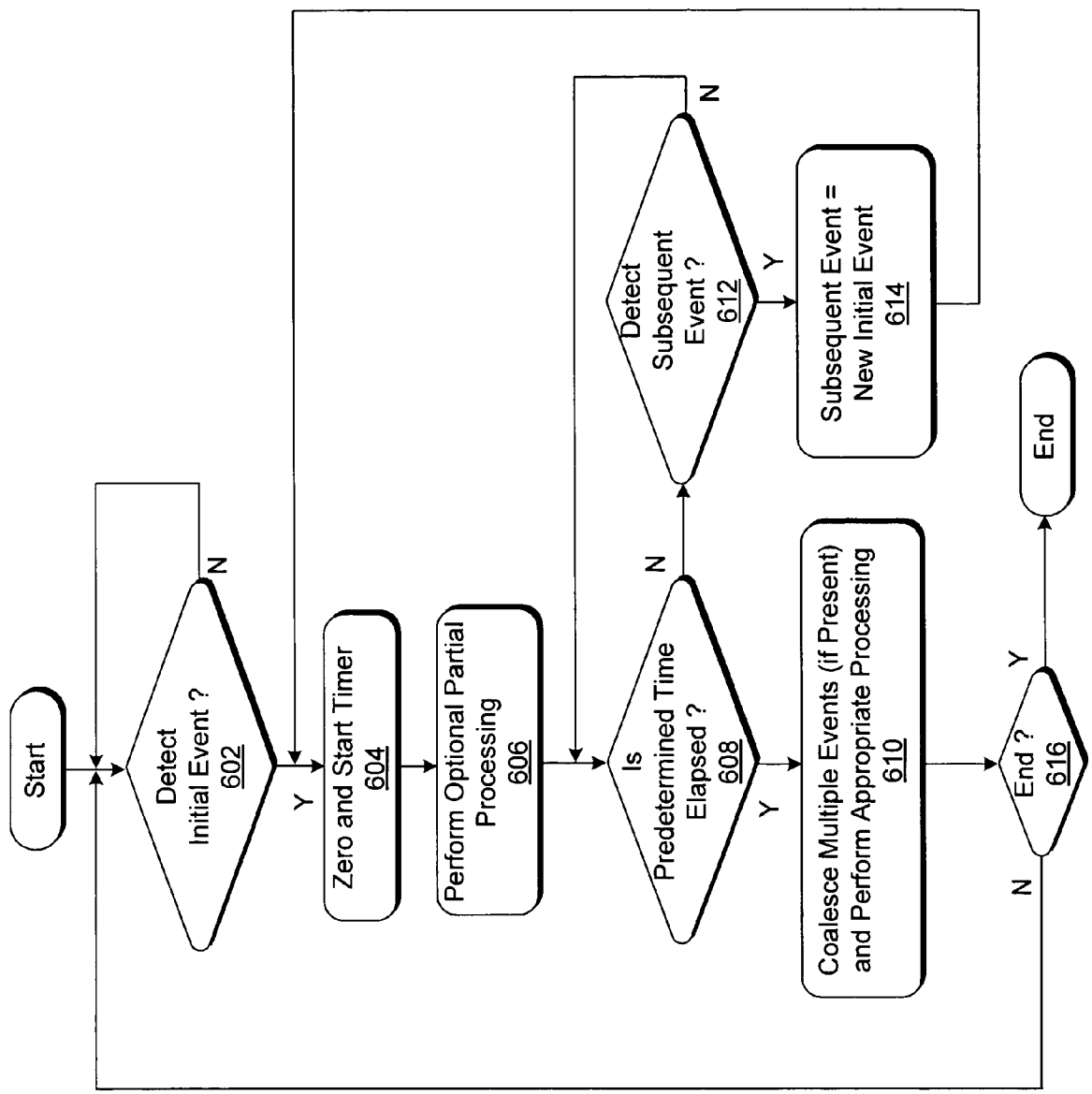
FIG. 6 shows an exemplary procedure in flowchart form that explains the operation of the module of FIG. 4.

FIG. 6 describes the operation of the system 100 of FIG. 1 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

In step 602, the system 100 determines whether an event has been detected. This can reflect the user 112 taking an express input action, or it can represent the system 100 automatically invoking an event. In the media presentation environment of FIG. 1, the control event may correspond to a user 112's instruction to change channels, to perform a seek operation within a single stream, or some other stream playback operation.

In step 604, the system 100 zeros and starts its timer module 406.

In step 606, the system 100 optionally performs immediate processing associated with the control event. For instance, for a first control event in a series of control events, the system 100 may flush its buffers (since this has to be performed anyway). Or step 606 may include the presentation of metadata associated with the control event, such as metadata describing a channel that the user 112 has switched to, even if only very briefly. This metadata can take the form of textual information describing the channel, and/or a reduced-sized picture of the content information being presented on the channel (e.g., as extracted from one or more key frames).

In step 608, the system 100 determines whether the time T on the timer module 406 has exceeded a prescribed threshold $T_{THRESH}$. If so, then, in step 610, the system 100 aggregates multiple control events that may have accumulated without being fully acted on by the system. The system 100 then performs processing on the accumulated control events in less time than it would take to execute each control event in stand-alone fashion. Coalescing can involve omitting redundant operations by directly achieving a desired terminal control state, rather than advancing through a potentially roundabout path that the user 112 may have taken to the final state.

Step 612 determines whether a subsequent control event has transpired prior to the expiration of the threshold period. If so, the subsequent control event is redefined as the initial control event (in step 614) and the timer module is re-zeroed and restarted (in step 604).

Step 616 determines whether the process should continue in the above-described manner, or terminate.

C. Exemplary Computer Environment

In one exemplary implementation, both the host module 102 and the client module 104 can be implemented by two computer devices that are appropriate configured to act in a host and client capacity, respectively. In this case, FIG. 7 provides information regarding an exemplary computer environment 700 that can be used to implement either the host module 102 or the client module 104.

The computing environment 700 includes a general purpose type computer 702 and a display device 704. However, the computing environment 700 can include other kinds of computing equipment. For example, although not shown, the computer environment 700 can include hand-held or laptop devices, set top boxes, game consoles, extension-type computers, mainframe computers, logic functionality embedded in rendering devices, and so forth. Further, FIG. 7 shows elements of the computer environment 700 grouped together to facilitate discussion. However, the computing environment 700 can employ a distributed processing configuration. In a distributed computing environment, computing resources can be physically dispersed throughout the environment.

Exemplary computer 702 includes one or more processors or processing units 706, a system memory 708, and a bus 710. The bus 710 connects various system components together. For instance, the bus 710 connects the processor 706 to the system memory 708. The bus 710 can be implemented using any kind of bus structure or combination of bus structures, including a memory bus or memory controller, a peripheral bus, an accelerated graphics port, and a processor or local bus using any of a variety of bus architectures.

Computer 702 can also include a variety of computer readable media, including a variety of types of volatile and non-volatile media, each of which can be removable or non-removable. For example, system memory 708 includes computer readable media in the form of volatile memory, such as random access memory (RAM) 712, and non-volatile memory, such as read only memory (ROM) 714. ROM 714 includes an input/output system (BIOS) 716 that contains the basic routines that help to transfer information between elements within computer 702, such as during start-up. RAM 712 typically contains data and/or program modules in a form that can be quickly accessed by processing unit 706.

Other kinds of computer storage media include a hard disk drive 718 for reading from and writing to a non-removable, non-volatile magnetic media, a magnetic disk drive 720 for reading from and writing to a removable, non-volatile magnetic disk 722 (e.g., a "floppy disk"), and an optical disk drive 724 for reading from and/or writing to a removable, non-volatile optical disk 726 such as a CD-ROM, DVD-ROM, or other optical media. The hard disk drive 718, magnetic disk drive 720, and optical disk drive 724 are each connected to the system bus 710 by one or more data media interfaces 728. Alternatively, the hard disk drive 718, magnetic disk drive 720, and optical disk drive 724 can be connected to the system bus 710 by a SCSI interface (not shown), or other coupling mechanism. Although not shown, the computer 702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 702. For instance, the readable media can store the operating system 730, application modules 732, other program modules 734, and program data 736.

The computer environment 700 can include a variety of input devices. For instance, the computer environment 700 includes the keyboard 738 and a pointing device 740 (e.g., a "mouse") for entering commands and information into computer 702. The computer environment 700 can include other input devices (not illustrated), such as a microphone, joystick, game pad, satellite dish, serial port, scanner, card reading devices, digital or video camera, etc. Input/output interfaces 742 couple the input devices to the processing unit 706. More generally, input devices can be coupled to the computer 702 through any kind of interface and bus structures, such as a parallel port, serial port, game port, universal serial bus (USB) port, etc.

The computer environment 700 also includes the display device 704. A video adapter 744 couples the display device 704 to the bus 710. In addition to the display device 704, the computer environment 700 can include other output peripheral devices, such as speakers (not shown), a printer (not shown), etc. Any of these units can constitute the target entities (120, 122, . . . 124) shown in FIG. 1.

Computer 702 operates in a networked environment using logical connections to one or more remote computers, such as a remote computing device 746. The remote computing device 746 can comprise any kind of computer equipment, including a general purpose personal computer, portable computer, a server, a game console, a network extension device, and so forth. Remote computing device 746 can include all of the features discussed above with respect to computer 702, or some subset thereof.

Any type of network 748 can be used to couple the computer 702 with remote computing device 746, such as a WAN, a LAN, etc. The computer 702 couples to the network 748 via network interface 750, which can utilize broadband connectivity, modem connectivity, DSL connectivity, or other connection strategy. Although not illustrated, the computing environment 700 can provide wireless communication functionality for connecting computer 702 with remote computing device 746 (e.g., via modulated radio signals, modulated infrared signals, etc.).

In one implementation, the computer 702 and computer 746 can correspond to the host module 102 and client module 104, respectively. In another implementation, the computer 702 and computer 746 can correspond to the host module 102 and source 108, respectively (where the source 108 can constitute a server computer). Still other applications are possible.

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for processing control events, the method comprising:
   receiving a first control event;
   partially processing the first control event to provide feedback indicating that the first control event has been received, wherein the partially processing comprises displaying a thumbnail image from a stream associated with processing the first control event, wherein each thumbnail image is reduced in size from an original size of each respective stream;
   receiving a second control event within a predetermined period of time of the first control event, wherein the first control event and the second control event correspond to two successive control requests issued in a media presentation system within the predetermined period of time; and
   aggregate-processing the first control event and the second control event together as a coalesced control event to provide a combined instruction, wherein the aggregate-processing of the first control event and the second control event together as a coalesced control event incurs a lower latency compared to separate processing of the first control event and the second control event, wherein the aggregate-processing comprises:
   omitting at least one operation that would be performed if the first control event was processed separately from the second control event;
   prompting the media presentation system with the first control request to switch from a first stream to a second stream;
   prompting the media presentation system with the second control request to switch from the second stream to a third stream; and
   determining a strategy for transitioning from an initial control state to a final control state in the coalesced control event, wherein the strategy for transitioning comprises:
   implementing a jitter buffer on a first-in-first-out (FIFO) basis where the jitter buffer stores content information from the first stream and the second stream, the media presentation system drawing from the jitter buffer when it presents the content information during transitioning;
   implementing a rate filter to reduce the bit rate of the streaming content when available network bandwidth drops; and
   inserting boundary information at every break between streams.

2. The method of claim 1, further comprising:
   receiving a third control event within a predetermined period of time of the second control event;
   partially processing the second control event to provide feedback indicating that the second control event has been received, wherein the partially processing of the second control event comprises displaying a thumbnail image from a stream associated with processing the second control event, and
   wherein the aggregate-processing involves processing the first control event, the second control event and the third control event as the combined control event.

3. The method of claim 1, wherein the aggregate-processing of the first control event and the second control event as a combined control event is prompted by the failure to receive a subsequent control event within a predetermined period of time of an immediately preceding control event.

4. The method of claim 1, wherein the first stream corresponds to a first channel, the second stream corresponds to a second channel, and the third stream corresponds to a third channel, and wherein the first control request and the second control request are channel change requests; wherein the thumbnail image is transmitted via a separate control channel than the first, second or third channels.

5. The method of claim 1, wherein the first stream corresponds to a first part of a media presentation program, the second stream corresponds to a second part of the media presentation program, and the third stream corresponds to a third part of the media presentation program, and wherein the first control request and the second control request are program seek requests.

6. The method of claim 1, wherein the aggregate-processing of the combined control event has the effect of ignoring the control request to advance to the second stream by advancing directly from the first stream to the third channel, and wherein each thumbnail image originates from a key frame from a respective channel.

7. The method of claim 1, wherein the media presentation system includes a play buffer, and wherein the aggregate-processing of the combined control event reduces the number of times that the buffer needs to be flushed and refilled, compared to separate processing of the first control request and the second control request.

8. The method of claim 1, wherein the partial processing additionally comprises displaying metadata associated with the first control event and skipping packets in a received stream until receiving stream boundary information.

9. The method of claim 8, wherein the metadata comprises textual information that confirms that the first control event has been received.

10. The method of claim 8, wherein the metadata comprises pictorial information that confirms that the first control event has been received.

11. The method of claim 9, wherein the first control event comprises a request to switch from the first stream to the second stream, and wherein the textual information describes information pertaining to the second stream.

12. The method of claim 10, wherein the first control event comprises a request to switch from the first stream to the second stream, and the pictorial information comprises a sample of content information being presented in the second stream.

13. The method of claim 12, wherein the sample comprises an I-Frame taken from content information being presented in the second stream.

14. A computer readable media having stored thereon machine readable instructions for implementing the method of claim 1.

15. A method for streaming content information from a host module to a client module, the method comprising:
   receiving a first control event defining a request to advance from a first stream to a second stream;
   partially processing the first control event to provide feedback indicating that the first control event has been received, wherein the feedback comprises displaying a reduced-sized thumbnail image from the second stream;
   receiving a second control event defining a request to advance from the second stream to a third stream, wherein the second control request occurs within a predetermined time period of the first control request, wherein the first control event and the second control event correspond to two successive control requests issued in a media presentation system;
   aggregate-processing the first control event and the second control event together as a coalesced control event to provide a combined instruction for advancing directly from the first stream to the third stream without advancing to the second stream, wherein the aggregate-processing comprises:
      prompting the media presentation system with the first control request to switch from the first stream to the second stream;
      prompting the media presentation system with the second control request to switch from the second stream to the third stream; and
      determining a strategy for transitioning from an initial control state to a final control state in the coalesced control event, wherein the strategy for transitioning comprises:
         implementing a jitter buffer on a first-in-first-out (FIFO) basis where the jitter buffer stores content information from the first stream and the second stream, the media presentation system drawing from the jitter buffer when it presents the content information during transitioning;
         implementing a rate filter to reduce the bit rate of the streaming content when available network bandwidth drops; and
         inserting boundary information at every break between streams.

16. The method of claim 15, wherein the first stream and the second stream correspond to different channels.

17. The method of claim 15, wherein the first stream and the second stream correspond to different parts of a single media stream.

18. The method of claim 15, wherein the partial processing additionally comprises displaying metadata that provides information pertaining to the second stream.

19. A computer readable media having stored thereon machine readable instructions for implementing the method of claim 15.

20. A method for processing control events, the method comprising:
   grouping together a plurality of control events that satisfy a specified timing criterion, the plurality of control events defining an initial control state associated with an initial control event and a final control state associated with a final control event, wherein the initial control event and the final control event correspond to two separate control requests issued in a media presentation system;
   aggregate-processing the plurality of control events to provide a combined instruction for directly advancing from the initial control state to the final control state, thereby omitting at least one processing step that would have otherwise been performed if the plurality of control events were separately processed;
   providing metadata that is related to said at least one processing step that has been omitted, wherein providing the metadata comprises displaying a reduced-sized thumbnail image from each media source associated with processing each respective control event processed without aggregate-processing;
   transitioning from the initial control state to the final control state by implementing a jitter buffer on a first-in-first-out (FIFO) basis where the jitter buffer stores content information from media sources, the media presentation system drawing from the jitter buffer when it presents the content information during transitioning;
   implementing a rate filter to reduce the bit rate of the media sources when available network bandwidth drops; and
   inserting boundary information at every break between media sources.

21. The method of claim 20, wherein the processing step that has been omitted pertains to a flushing and refilling of a buffer associated with an interim control event within the plurality of control events.

22. A computer readable media having stored thereon machine readable instructions for implementing the method of claim 20.

23. A coalescing module configured to process control events, the coalescing module comprising:
   an event detection module configured to detect a first control event and a second control event;
   a timer module configured to keep time;
   a partial processing module configured to partially process the first control event to provide feedback indicating that the first control event has been received, wherein the feedback comprises displaying a reduced-sized thumbnail image from a media source associated with a result of the first control event; and an aggregation module configured to aggregate-process the first control event and the second control event together as a coalesced control event to provide a combined instruction if it is determined, based on an output of the timer module, that the second control event has occurred within a predetermined time period of the first control event, wherein the first control event and the second control event correspond to two successive control requests issued in a media presentation system, wherein processing of the first control event and the second control event as the coalesced control event involves omitting at least one operation that would be performed if the first control event was processed separately from the second control event, wherein the aggregate-processing further comprises determining a strategy for transitioning from the first control event to the second control event in the coalesced control event, the strategy including implementing a jitter buffer on a first-in-first-out (FIFO) basis where the jitter buffer stores content information from the first stream and the second stream (the media presentation system drawing from the jitter buffer when it presents the content information during transitioning), implementing a rate filter to reduce the bit rate of the streaming content when available network bandwidth drops, and inserting boundary information at every break between streams; and wherein the aggregate-processing of the first control event and the second control event together as a coalesced control event incurs a lower latency compared to separate processing of the first control event and the second control event.

24. A system for streaming content information from a host module to a client module, the system comprising:

a host module for streaming the content information;

a client module for receiving the content information;

a communication mechanism for coupling the host module and the client module together, wherein the host module and the client module together implement an aggregation module, the aggregation module configured to aggregate-process a first stream control event and a second stream control event together as a coalesced stream control event to provide a combined instruction if it is determined that the second stream control event has occurred within a predetermined time period of the first stream control event, wherein processing of the first stream control event and the second stream control event as the coalesced stream control event involves omitting at least one operation that would be performed if the first control event was processed separately from the second control event, wherein the first control request prompts the media presentation system to switch from a first stream to a second stream and display a reduced-sized thumbnail image from the second stream, and the second control request prompts the media presentation system to switch from the second stream to a third stream, wherein the aggregate-processing further comprises determining a strategy for transitioning from an initial control state to a final control state in the coalesced control event, the strategy including (1) implementing a jitter buffer on a first-in-first-out (FIFO) basis where the jitter buffer stores content information from the first stream and the second stream (the media presentation system drawing from the jitter buffer when it presents the content information during transitioning) (2) implementing a rate filter to reduce the bit rate of the streaming content when available network bandwidth drops and (3) inserting boundary information at every break between streams, and wherein the aggregate-processing of the first stream control event and the second stream control event together as a coalesced stream control event incurs a lower latency compared to separate processing of the first control event and the second control event.

* * * * *